US009500796B2

(12) United States Patent
An et al.

(10) Patent No.: US 9,500,796 B2
(45) Date of Patent: Nov. 22, 2016

(54) QUANTUM DOT FILLED TUBE AND RELATED DISPLAY DEVICE

(71) Applicant: Samsung Display Co., Ltd., Yongin, Gyeonggi-Do (KR)

(72) Inventors: Jae-Sul An, Seoul (KR); Dae-hoon Song, Seoul (KR); Dong-hyeon Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 120 days.

(21) Appl. No.: 14/473,825

(22) Filed: Aug. 29, 2014

(65) Prior Publication Data

US 2015/0301258 A1 Oct. 22, 2015

(30) Foreign Application Priority Data

Apr. 16, 2014 (KR) .................. 10-2014-0045310

(51) Int. Cl.
*G02B 6/00* (2006.01)
*F21V 8/00* (2006.01)
*G02F 1/1335* (2006.01)

(52) U.S. Cl.
CPC ....... *G02B 6/0023* (2013.01); *G02F 1/133615* (2013.01); *G02F 2202/36* (2013.01)

(58) Field of Classification Search
CPC .................. G02B 6/0026; G02F 1/133615
See application file for complete search history.

(56) References Cited

U.S. PATENT DOCUMENTS

| 7,696,693 | B2 | 4/2010 | Lim | |
|---|---|---|---|---|
| 2006/0202603 | A1 | 9/2006 | Lim | |
| 2007/0263405 | A1* | 11/2007 | Ng | G02B 6/0003 362/555 |
| 2011/0309735 | A1* | 12/2011 | Parker | F21K 9/135 313/46 |
| 2012/0257414 | A1 | 10/2012 | Park et al. | |
| 2013/0050612 | A1 | 2/2013 | Hur et al. | |
| 2013/0148376 | A1 | 6/2013 | Nick et al. | |
| 2013/0294107 | A1* | 11/2013 | Ohkawa | G02F 1/133615 362/606 |
| 2014/0009959 | A1* | 1/2014 | Park | F21V 9/16 362/559 |
| 2014/0307416 | A1* | 10/2014 | Van Der Wel | F21V 3/00 362/84 |

FOREIGN PATENT DOCUMENTS

| KR | 1020120002267 | 1/2012 |
|---|---|---|
| KR | 1020120031798 | 4/2012 |
| KR | 1020120039773 | 4/2012 |
| KR | 1020120048328 | 5/2012 |
| KR | 1020130010966 | 1/2013 |
| KR | 1020130019936 | 2/2013 |

* cited by examiner

*Primary Examiner* — Julie Bannan
(74) *Attorney, Agent, or Firm* — Innovation Counsel LLP

(57) ABSTRACT

A quantum dot filled tube may include a tube having a cavity therein and a phosphor disposed inside the tube. The tube may include: a first tube including a first filling cavity therein; a second tube including a second filling cavity therein; and a connecting unit including a third filling cavity configured to connect the first filling cavity and the second filling cavity.

18 Claims, 8 Drawing Sheets

QUANTUM DOT FILLED TUBE AND RELATED DISPLAY DEVICE

CROSS-REFERENCE TO RELATED APPLICATION

This application claims priority to and the benefit of Korean Patent Application No. 10-2014-0045310, filed on Apr. 16, 2014, with the Korean Intellectual Property Office, the disclosure of which is incorporated herein in its entirety by reference.

BACKGROUND

1. Field

The present disclosure relates to a quantum dot filled tube designed to easily inject a phosphor including quantum dots and prevent gas inclusion inside the quantum dot filled tube and a display device that includes the quantum dot filled tube.

2. Description of the Related Art

With the recent trend of low carbon green growth all over the world, light emitting diodes (LEDs), which are regarded as a low-pollution eco-friendly product, have been increasingly used as a backlight of various liquid crystal displays in order to reduce energy consumption and decrease greenhouse gas.

A liquid crystal display (LCD) is a type of flat panel displays (FPDs), which is the most widely used these days, and includes two substrates on which electrodes are formed and a liquid crystal layer which is interposed therebetween. In a case where voltage is applied on the electrode, liquid crystal molecules of the liquid crystal layer are rearranged, such that an amount of transmitted light can be adjusted.

A liquid crystal display (LCD), which is a passive light emitting device, includes a display panel for displaying an image and a backlight assembly for supplying light to the display panel. The backlight assembly is classified into three types depending on the position of a light source: a direct type, an edge type, and a corner type.

Meanwhile, an LED having low-power high-efficiency characteristics has been widely used as a light source in recent years. The LED light source emits blue light, and provides white light by using color converting materials such as a phosphor and the like. Blue light is later converted into white light such that full color display is realized through a color filter of a liquid crystal panel, and thus there has been increased emphasis on research to improve color reproducibility by adjusting an emission spectrum of white light and a transmission spectrum of the color filter.

Therefore, as an example of the method for realizing the white light with excellent color reproducibility, it has been suggested that a quantum dot tube be inserted between a blue LED light source and a light guide plate.

The display device may include a thin pipe-shaped tube filled with quantum dots installed in front of a blue LED light source, such that the blue LED light source can pass through the quantum dot filled tube, thereby realizing white light. The produced white light exhibits excellent color reproducibility compared to a conventional white LED light source.

However, there may be areas not filled with quantum dots in the quantum dot filled tube due to the characteristics of the manufacturing process. That is, in a case where a first end of the tube is sealed before quantum dots are injected into an injection cavity formed at a second end of the tube, the inside of the tube may not be completely filled with quantum dots, such that gas inclusions may be produced. The produced gas inclusions in the tube may cause deterioration of color or luminance uniformity of the white light at a light incident portion.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

The present disclosure is directed to a quantum dot filled tube designed to prevent gas inclusions generated inside a tube and to a display device including the quantum dot filled tube.

According to an embodiment, a quantum dot filled tube may include a tube having a cavity therein and a phosphor disposed inside the tube. The tube may include: a first tube including a first filling cavity therein; a second tube including a second filling cavity therein; and a connecting unit including a third filling cavity configured to connect the first filling cavity and the second filling cavity.

The first tube may be disposed parallel to the second tube.

The connecting unit may be bent at a first end of the first tube and extended to a first end of the second tube.

The quantum dot filled tube may further include a sealing member for sealing a second end of the first tube and a second end of the second tube.

The connecting unit may have a U-shaped cross-section.

The first filling cavity may be spaced apart from the second filling cavity by a distance in a range of about 0.1 mm to about 1 mm.

The second tube may be disposed inside the first tube.

An external surface of the second tube may be connected to an inner surface of the first tube.

The first tube and the second tube may have a diameter in a range of about 0.5 mm to about 2.5 mm.

The first to third filling cavities may have a diameter in a range of about 0.4 mm to about 2.3 mm.

The phosphor may include quantum dot particles.

The quantum dot particles may have a diameter in a range of about 2 nm to about 10 nm.

According to another embodiment, a display device may include a light source; a light guide plate; and at least one quantum dot filled tube. The light guide plate is configured to have the light be incident on one surface and be emitted from an other surface of the light guide plate. The at least one quantum dot filled tube is disposed between the light source and the light guide plate. The quantum dot filled tube may include: a tube having a cavity therein; and a phosphor disposed inside the tube. The tube may include: a first tube including a first filling cavity therein; a second tube including a second filling cavity therein; and a connecting unit including a third filling cavity configured to connect the first filling cavity and the second filling cavity.

The first tube may be disposed parallel to the second tube.

The connecting unit may be bent at a first end of the first tube and extended to a first end of the second tube.

The display device may further include a sealing member for sealing a second end of the first tube and a second end of the second tube.

The connecting unit may have a U-shaped cross-section.

The first tube may be spaced apart from the second tube by a distance in a range of about 0.1 mm to about 1 mm.

The second tube may be disposed inside the first tube.

An external surface of the second tube may be connected to an inner surface of the first tube.

According to embodiments, a quantum dot filled tube is capable of preventing gas inclusions, capable of providing improved color or luminance uniformity of white color of the display device, and capable of making it easy to inject the phosphor.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure will be more clearly understood from the following detailed description taken in conjunction with the accompanying drawings, in which.

DETAILED DESCRIPTION

Figure 1:
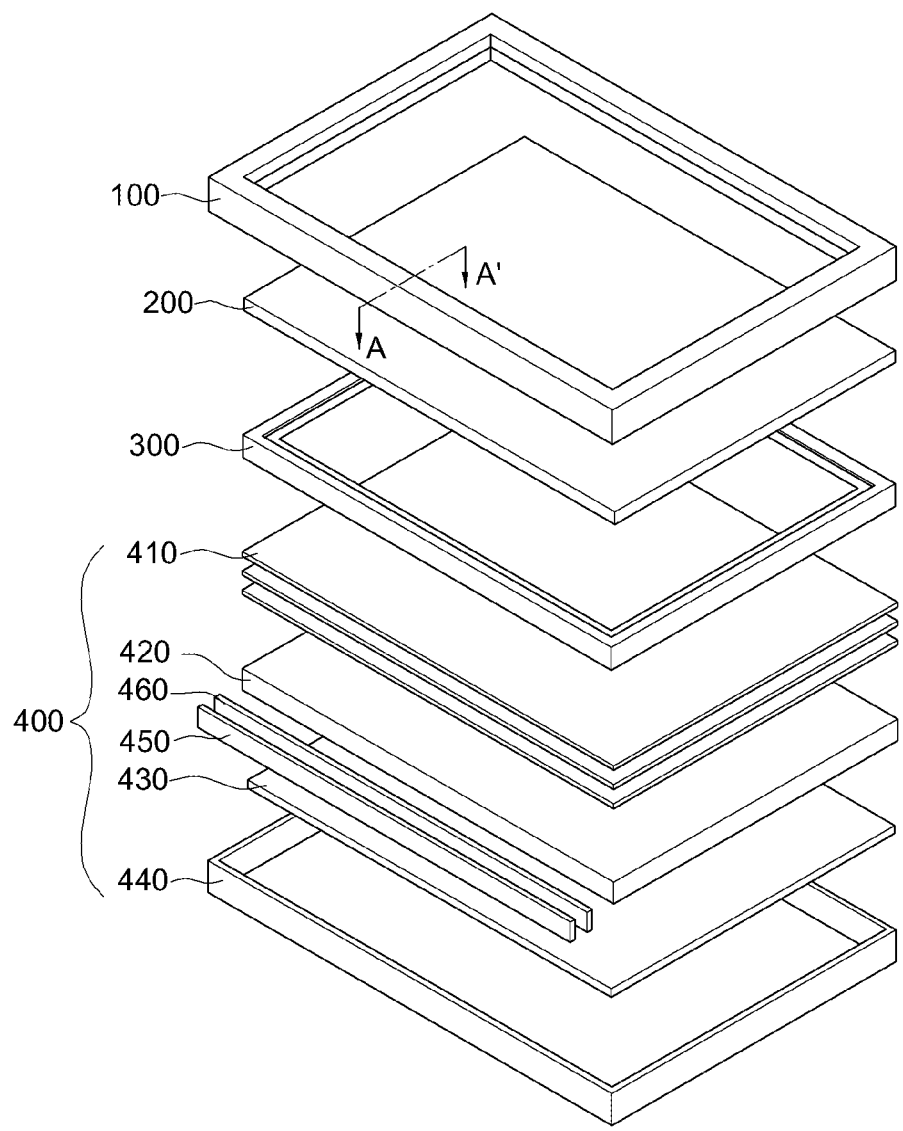
FIG. 1 is an exploded perspective view showing a display device according to an embodiment.

Features and methods for achieving them will be made clear from embodiments described below in detail with reference to the accompanying drawings. The inventive concept may, however, be embodied in many different forms and should not be construed as being limited to the embodiments set forth herein. Rather, these embodiments are provided so that this disclosure will be thorough and complete, and will fully convey the scope of the inventive concept to those skilled in the art. The inventive concept is merely defined by the scope of the claims. Therefore, well-known constituent elements, operations and techniques are not described in detail in the embodiments in order to prevent the inventive concept from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

The terminology used herein is for the purpose of describing particular embodiments only and is not construed as limiting. As used herein, the singular forms "a," "an" and "the" are intended to include the plural forms as well, unless the context clearly indicates otherwise. It will be further understood that the terms "comprises" and/or "comprising," when used in this specification, specify the presence of mentioned component, step, operation and/or element, but do not exclude the presence or addition of one or more other components, steps, operations and/or elements.

Unless otherwise defined, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, with reference to FIGS. 1 and 2, a display device according to an embodiment will be described in detail. A liquid crystal panel 200 is described as an embodiment; however, embodiments are not limited thereto. Thus, other than the liquid crystal panel 200, any structures provided in a panel form capable of receiving light from a backlight assembly 400 for displaying an image can be applied to embodiments.

FIG. 1 is an exploded perspective view showing a display device according to an embodiment. Further, FIG. 2 is a cross-sectional view taken along a line A-A' of FIG. 1.

Figure 2:
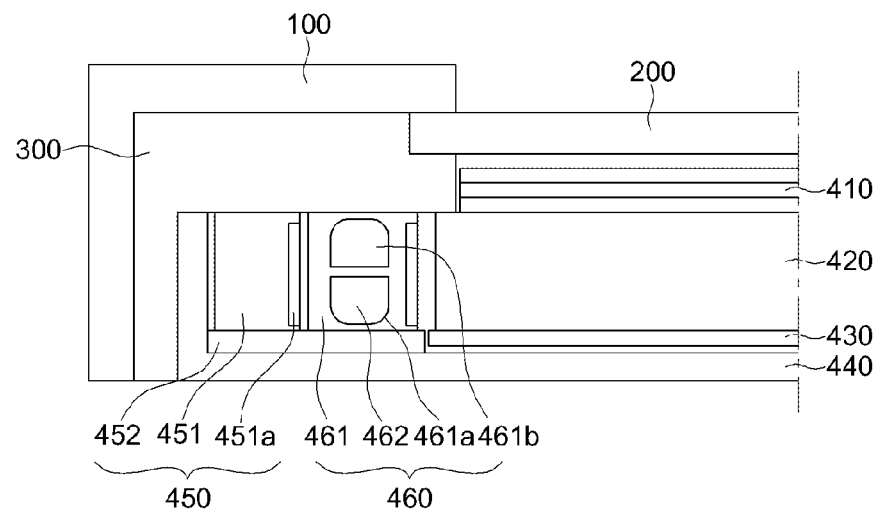
FIG. 2 is a cross-sectional view taken along a line A-A' of FIG. 1.

With reference to FIGS. 1 and 2, the display device includes the liquid crystal panel 200 configured to display an image, the backlight assembly 400 configured to supply light to the liquid crystal panel 200, a top case 100 configured to cover the liquid crystal panel 200, and a mold frame 300 configured to connect the top case 100 and a bottom case 440 for supporting the liquid crystal panel 200.

The mold frame 300 is coupled to the bottom case 440 and accommodates the liquid crystal panel 200. The mold frame 300 may be formed of a flexible material, such as plastics, so as to prevent damage on the liquid crystal panel 200.

The top case 100 is coupled to the mold frame 300 and the bottom case 440 so as to cover the liquid crystal panel 200 seated on the mold frame 300. The top case 100 has an open window positioned in the middle to expose the liquid crystal panel 200.

The top case 100 can be coupled to the mold frame 300 and the bottom case 440 by hooks and/or screws. Further, the top case 100 and the bottom case 440 can be coupled to each other through a variety of methods.

The backlight assembly 400 includes an optical sheet 410, a light guide plate 420, a reflective sheet 430, a bottom case 440, a light source unit 450, and a quantum dot filled tube 460.

A light source unit 450 includes a light source 451 and a circuit substrate 452 on which the light source 451 is disposed. The light source unit 450 may be formed on corner portions or light incident surfaces of the light guide plate 420. That is, the light source unit 450 may emit light toward the corner portions or the light incident surfaces of the light guide plate 420.

The light source 451 may include at least one LED chip (not illustrated) and a package (not illustrated) for accommodating the LED chip. The light source 451 may have a light exit surface 451a facing at least one surface of the light guide plate 420.

The circuit substrate 452 is made of, for example, a printed circuit board (PCB) or a metal PCB.

One or more light source units 450 may be formed on one side surface, each of two side surfaces, or each of four side surfaces of the light guide plate 420, or on at least one corner portion of the light guide plate 420 in consideration of the size, the brightness uniformity requirements, and/or other factors associated with the display panel.

Light emitted from the light source 451 is incident toward at least one incident surface of the light guide plate 420 and emitted toward the light exit surface of the light guide plate 420. The light guide plate 420 may substantially uniformly supply light provided from the light source unit 450 toward the liquid crystal panel 200. The light guide plate 420 is disposed close to the light source unit 450, and accommodated in the bottom case 440. The light guide plate 420 may be provided in a form of, for example, a quadrilateral plate as the liquid crystal panel 200. However, embodiments are not limited thereto, and thus, in a case where an LED is used as a light source 451, the light guide plate 420 may have various forms and may include predetermined grooves, protrusions, and other structures in accordance with the positions of the light sources.

The light guide plate 420 is, for ease of description, depicted as a plate; however, the light guide plate 420 may be provided in a form of a sheet or a film so as to provide a display device having a slimmer structure. In other words, the light guide plate 420 may be defined as a concept including a plate and a film for guiding light.

The light guide plate 420 may be formed of a light-transmissive material such as, for example, an acrylic resin such as polymethylmethacrylate (PMMA) or polycarbonate (PC) so as to guide light efficiently.

A pattern may be formed on at least one surface of the light guide plate 420. For example, a scattering pattern (not illustrated) may be formed on a lower surface, so as to scatter and/or reflect the guided light upwards.

The optical sheet 410 is disposed on an upper portion of the light guide plate 420 and may diffuse and/or collect light transmitted from the light guide plate 420. The optical sheet 410 may include one or more of a diffusion sheet, a prism sheet, a protective sheet, and other functional sheets.

The diffusion sheet may disperse light incident from the light guide plate 420 so as to prevent the light from being partly concentrated.

The prism sheet may include prisms having a triangular cross-section and formed in a predetermined array on one surface. Further, the prism sheet is disposed on the diffusion sheet and thus may collect light diffused from the diffusion sheet in a direction perpendicular to the liquid crystal panel 200.

The protective sheet may be formed on the prism sheet. Further, the protective sheet serves to protect a surface of the prism sheet and to diffuse light to make light distribution uniform.

The reflective sheet 430 is disposed between the light guide plate 420 and the bottom case 440, so that light emitted downwards from the light guide plate 420 is reflected toward the liquid crystal panel 200, thereby increasing light efficiency.

The reflective sheet 430 may be formed of, for example, polyethylene terephthalate (PET), thereby possessing a reflectance property. One surface of the reflective sheet may be coated with a diffusion layer containing, for example, titanium dioxide.

In an embodiment, the reflective sheet 430 may be formed of a material containing a metal, such as silver (Ag).

The bottom case 440 may accommodate the reflective sheet 430 and the light guide plate 420. A bottom surface of the bottom case 440 is formed parallel to the light guide plate 420. The bottom case 440 may be formed of a metal material having rigidity, such as stainless steel, or a material having good heat dissipation properties, such as aluminum or an aluminum alloy. The bottom case 440 is responsible for maintaining a framework of the display device and protecting a variety of components accommodated therein.

In order to realize white light having high color reproducibility with such a backlight assembly structure, the quantum dot filled tube 460 is disposed between the light source unit 450 and the light guide plate 420. Hereinafter, the quantum dot filled tube 460 according to an embodiment will be described in more detail with reference to FIGS. 3 and 4.

Figure 3:
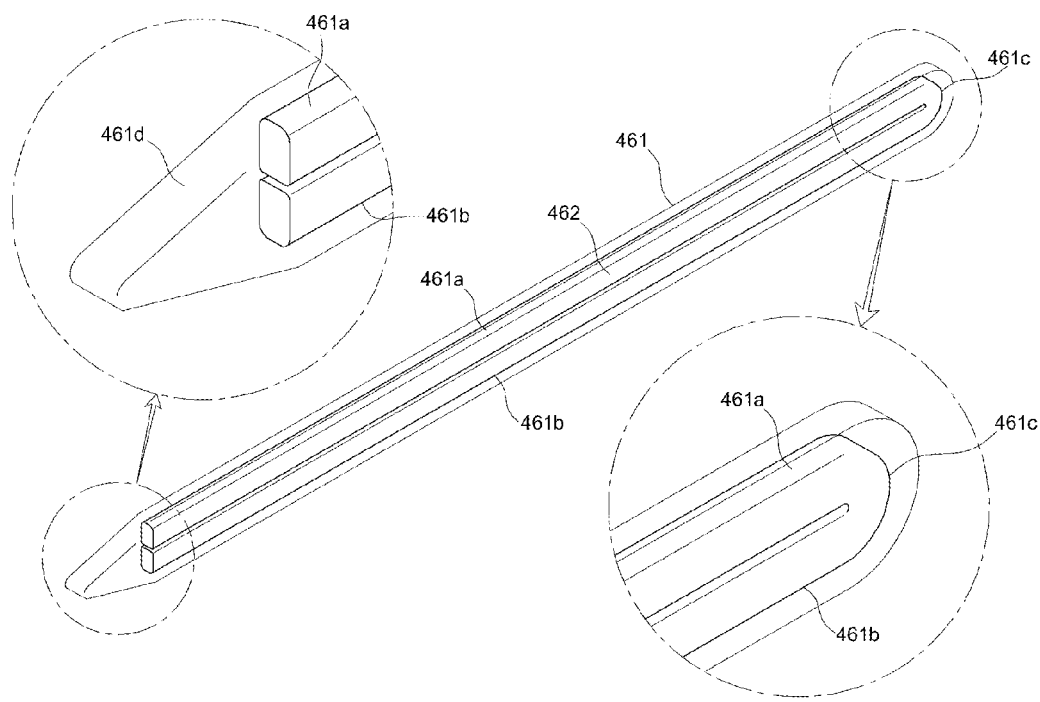
FIG. 3 is a perspective view showing the quantum dot filled tube illustrated in FIG. 1.
Figure 4:
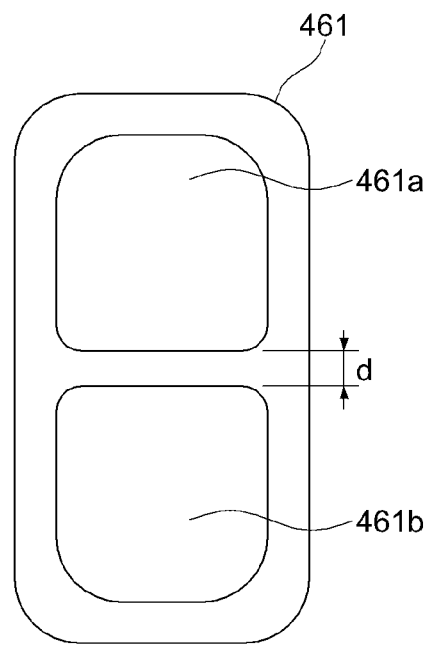
FIG. 4 is a cross-sectional view showing a quantum dot filled tube according to an embodiment.

FIG. 3 is a perspective view showing the quantum dot filled tube 460 illustrated in FIG. 1. Further, FIG. 4 is a cross-sectional view showing the quantum dot filled tube 460 according to an embodiment.

A conventional quantum dot filled tube includes a glass tube and a phosphor sealed in the glass tube.

The glass tube seals the phosphor and prevents moisture infiltration. The glass tube may have a polygonal or oval cross-section. The phosphor is injected into the glass tube that is in a vacuum state.

Hereinafter, a conventional method of manufacturing the quantum dot filled tube is described.

A glass tube having a polygonal or oval cross-section is prepared. A first end portion of the glass tube is heated to be sealed (a first sealing process). Subsequently, air inside the glass tube is removed through a second end portion, which is open, so that the glass tube is in a vacuum state. In an embodiment, an air pump may be used for air exhaustion.

Next, a phosphor is injected into the glass tube, which is in a vacuum state, using nitrogen gas $N_2$, and heat is applied to the second end portion to seal the second end portion (a second sealing process).

In a case where, as described above, the inside of the glass tube has been in a vacuum state before the phosphor is injected using nitrogen gas $N_2$, gas inclusions may remain inside the glass tube. That is, because one end of the glass tube is sealed, gas inclusions generated when the phosphor is injected may not be discharged outside and remain inside the tube.

Therefore, embodiments provide a quantum dot filled tube capable of removing air from the glass tube without a vacuum process for exhausting air.

With reference to FIGS. 3 and 4, the quantum dot filled tube 460 includes a tube 461 having a cavity structure inside and a phosphor 462 filled in the tube 461.

The tube 461 is made of a glass material and includes a cavity formed inside and the cavity has a U-shaped cross-section. In other words, a first end of the tube 461 is sealed in a conventional manner. Then, an inlet and an outlet for the phosphor 462 are formed at a second end of the tube 461. Accordingly, the phosphor 462 is injected from the inlet and squeezed out toward the outlet, and thus gas inclusions are not produced inside the tube 461.

The tube 461 according to an embodiment will be described in more detail.

With reference to FIGS. 3 and 4, the tube 461 includes a cavity structure, which has a U-shaped cross-section, formed inside. In more detail, the tube 461 has three cavities which are extended in a direction that is parallel to the length of the tube 461 and the three cavities pass through the tube 461. One of the three cavities disposed at an upper portion is named a first filling cavity and the upper portion of the tube 461 including the first filling cavity is named a first tube 461a. One of the three cavities disposed at a bottom portion is named a second filling cavity and the bottom portion of the tube 461 including the second filling cavity is named a second tube 461b. Further, a connecting cavity which has a U-shaped cross-section and is configured to connect the two cavities is named a third filling cavity. Further, one end of the tube 461 including the third filling cavity is named a connecting unit 461c.

The tube 461 includes the first tube 461a including the first filling cavity in which the phosphor 462 is filled, the second tube 461b including the second filling cavity in which the phosphor 462 is filled, and the connecting unit 461c including the third filling cavity configured to connect the first filling cavity and the second filling cavity.

The first tube 461a and the second tube 461b have a diameter in a range of about 0.5 mm to about 2.5 mm. The first to third filling cavities have a diameter in a range of about 0.4 mm to about 2.3 mm. Thus, the tube 461 including the first tube 461a and the second tube 461b has a diameter in a range of about 1 mm to about 5 mm. In general, a thickness of the light guide plate 420 is in a range of about 1 mm to about 5 mm, and the tube 461 has a diameter similar to a thickness of the light guide plate 420, such that light incident toward the light guide plate 420 can pass through.

Meanwhile, the tube 461 has a length in a range of about 0.1 m to about 2 m. The tube 461 may be disposed on a surface on one side of the display device, and thus one or more tubes may be disposed in connection depending on the length of one side of the display device.

The tube 461 includes the first tube 461a and the second tube 461b disposed parallel to each other. The first tube 461a and the second tube 461b are extended in a direction that is parallel to the length of the tube 461 and include a cavity passing through the inside of the tube 461.

The connecting unit 461c is bent on one end of the first tube 461a and extended to one end of the second tube 461b. That is, the connecting unit 461c of the tube 461 has a U-shaped cross-section.

According to an embodiment, the quantum dot filled tube 460 may be manufactured by forming a cavity having a U-shaped cross-section in a glass tube. In addition, the connecting unit 461c may also be manufactured in a following method: connecting two tubes, each having a cavity; and applying heat on a first end of the first tube 461a and a first end of the second tube 461b to form a cavity for connecting each other and seal. Methods of manufacturing the connecting unit 461c will be described in more detail in FIG. 9b.

Meanwhile, the tube 461 may further include a sealing member 461d for sealing a second end of the first tube 461a and a second end of the second tube 461b. The sealing member 461d may be the same material as the tube 461 and may be connected to the second end by laser sensitive glass frit and the like. Of course, instead of connecting the sealing member 461d, the second end of the tube 461 may be sealed by applying heat thereon. The sealing member 461d may be formed to have a triangular-shape cross-section as illustrated in FIG. 3.

Meanwhile, the first filling cavity is spaced apart from the second filling cavity by a distance in a range of about 0.1 mm to about 1 mm. That is, the distance d illustrated in FIG. 4 is in a range of about 0.1 mm to about 1 mm. In a case where the distance between the two filling cavities is more than 1 mm, the light emitted from the light source may pass through the tube 461 without passing through the phosphor 462, and thus it is desirable to minimize the distance between the filling cavities.

The phosphor 462 is a substance that changes a wavelength of light emitted from the light source 451. For example, the phosphor 462 is disposed between a blue LED light source and the light guide plate 420, such that blue light emitted from the blue LED light source can be converted into white light by changing the wavelength of the blue light.

In more detail, the phosphor 462 may include quantum dots. The quantum dot is a wavelength conversion particle that converts a wavelength of light so as to emit specific light. Quantum dots with different particle sizes convert different wavelengths. Therefore, light of a desired color can be emitted by adjusting a diameter of a quantum dot.

The phosphor 462 may include a green conversion particle and a red conversion particle, which may be composed of quantum dots. The green conversion particle has a smaller diameter than the red conversion particle.

The quantum dot particle may generate a much stronger fluorescence effect than a general phosphor in a small wavelength range. Further, the quantum dot may have semiconductor particles, such as CdSe, CdTe, CdS, and the like, that are composed of nano-sized elements of groups II-IV in the core of the quantum dot. For example, the quantum dot particle has a diameter in a range of about 2 nm to about 10 nm, and the particle size may be adjustable where necessary.

In a case where the quantum dot has a small diameter, a wavelength of emitted light becomes shorter such that blue-based light is generated. In contrast, when the size of the quantum dot increases, the wavelength of emitted light becomes longer such that red-based light is generated.

The quantum dot may have a dual structure including an inner core and an outer shell surrounding the inner core. For instance, the quantum dot composed of CdSe and ZnS may include an inner core made of CdSe and an outer shell made of ZnS.

Wavelength conversion of light by the quantum dots will be described below in detail. For example, light emitted from a blue LED light source passes through the quantum dot particles disposed inside the quantum dot filled tube 460. The light passing through a small-sized quantum dot is converted to green light, the light passing through a large-sized quantum dot is converted to red light, and the light passing through between the two quantum dots is not converted and remains as blue light. Thus, these three colors of light of red R, green G, and blue B are mixed so that white light is produced. In an embodiment, the quantum dot with a small diameter may be a green conversion particle, and the quantum dot with a large diameter may be a red conversion particle.

In a case where blue light emitted from the light source 451 passes through the red conversion particle, the blue light is converted into red light. However, although the converted red light passes through the green conversion particle, the red light remains as red light. That is, the green conversion particle converts light having wavelengths shorter than the wavelength of green light, and thus the red light having passed through the green conversion particle is not converted and remains as red light. Quantum dot particles have predetermined band gaps formed depending on the size of a quantum dot particle. Therefore, in a case where a wavelength longer than a specific wavelength is incident, the wavelength is not converted when passing through the quantum dots.

On the contrary, in a case where blue light emitted from the light source 451 passes through the green conversion particle before passing through the red conversion particle, the blue light is converted into the green light when passing through the green conversion particle and part of the converted green light is converted into red light when passing through the red conversion particle. Therefore, the quantum dot filled tube 460 may produce light having a desired color by adjusting amount of quantum dot particles including green conversion particles and red conversion particles.

Meanwhile, according to an embodiment, a glass tube having a U-shaped inner cavity is provided as a tube 461. In addition, according to another embodiment, a glass tube may include another glass tube disposed inside to form the quantum dot filled tube 460 according to an embodiment.

Hereinafter, a tube 461 according to another embodiment will be described with reference to FIGS. 5 through 8. Repeated descriptions will not be provided.

Figure 5:
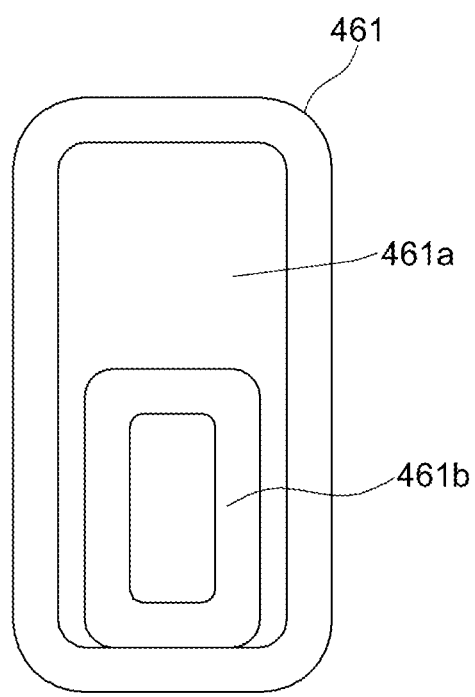
FIG. 5 is a cross-sectional view showing a quantum dot filled tube according to another embodiment.
Figure 6:
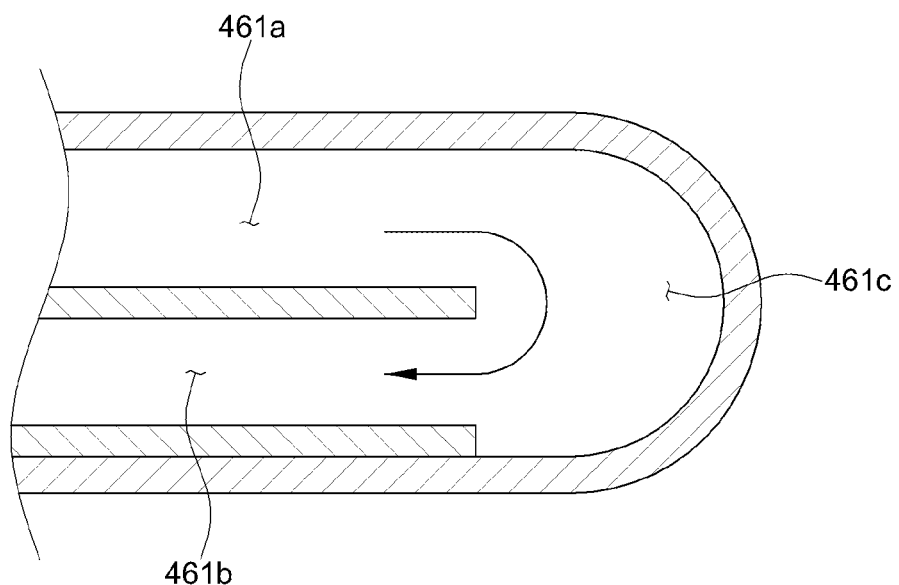
FIG. 6 is a cross-sectional view showing an end of a quantum dot filled tube including a connecting unit disposed thereon according to another embodiment.

With reference to FIGS. 5 and 6, the second tube 461b may be disposed inside the first tube 461a. That is, the second tube 461b is connected to the inner surface of the first tube 461a. The second tube 461b has an external diameter smaller than an inner diameter of the first tube 461a.

The connecting unit 461c includes a third filling cavity connecting a second filling cavity of the second tube 461b to a first filling cavity of the first tube 461a as illustrated in FIG. 6. A phosphor may be injected from the first tube 461a to the second tube 461b through the third filling cavity in a direction of an arrow described in FIG. 6.

Figure 7:
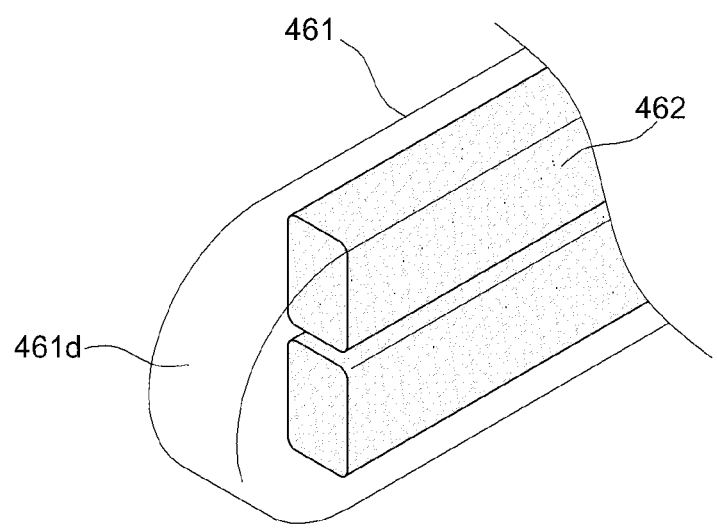
FIGS. 7 and 8 are perspective views showing a sealing member according to another embodiment.
Figure 8:
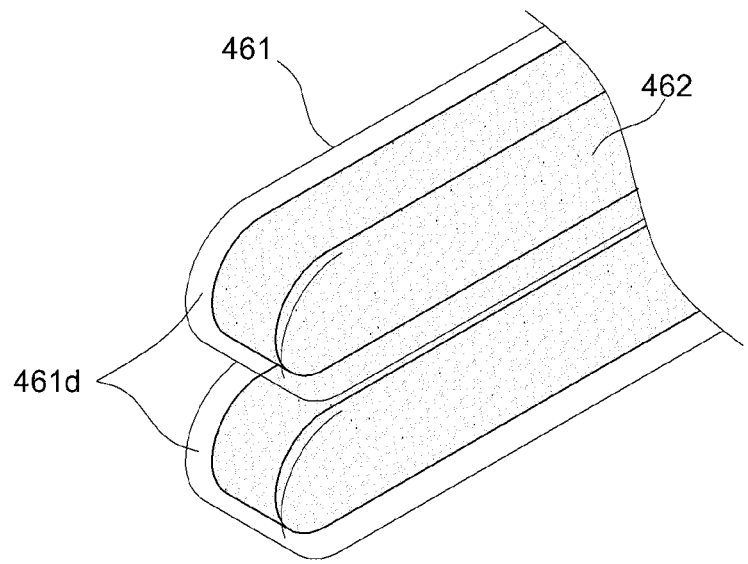

Meanwhile, the sealing member 461d may be manufactured in a form of a half circle as described in FIG. 7. In another embodiment, the sealing member 461d may seal the first tube 461a and the second tube 461b, respectively, as illustrated in FIG. 8.

In other words, the quantum dot filled tube 460 according to an embodiment may include a filling cavity having a U-shaped cross-section formed by using two tubes, or may include a filling cavity having a U-shaped cross-section formed by using one tube.

Hereinafter, a method of manufacturing a quantum dot filled tube according to an embodiment will be described with reference to FIGS. 9a to 9e.

FIGS. 9a to 9e are perspective views for explaining a method of manufacturing a quantum dot filled tube according to an embodiment.

Figure 9A:
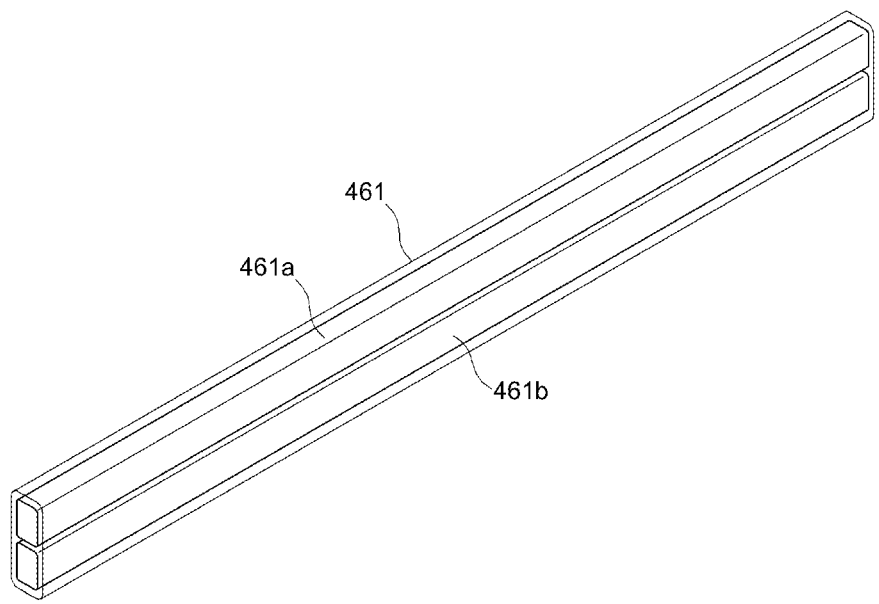
FIGS. 9a, 9b, 9c, 9d, 9e are perspective views for explaining a method of manufacturing a quantum dot filled tube according to an embodiment.

As described in FIG. 9a, a tube 461 having two cavities, which are extended in a direction that is parallel to the length of the tube 461 and pass through the tube 461, is prepared. A tube including one of the two cavities disposed at an upper portion is named a first tube 461a and a tube including one of the two cavities disposed at a bottom portion is named a second tube 461b.

Figure 9B:
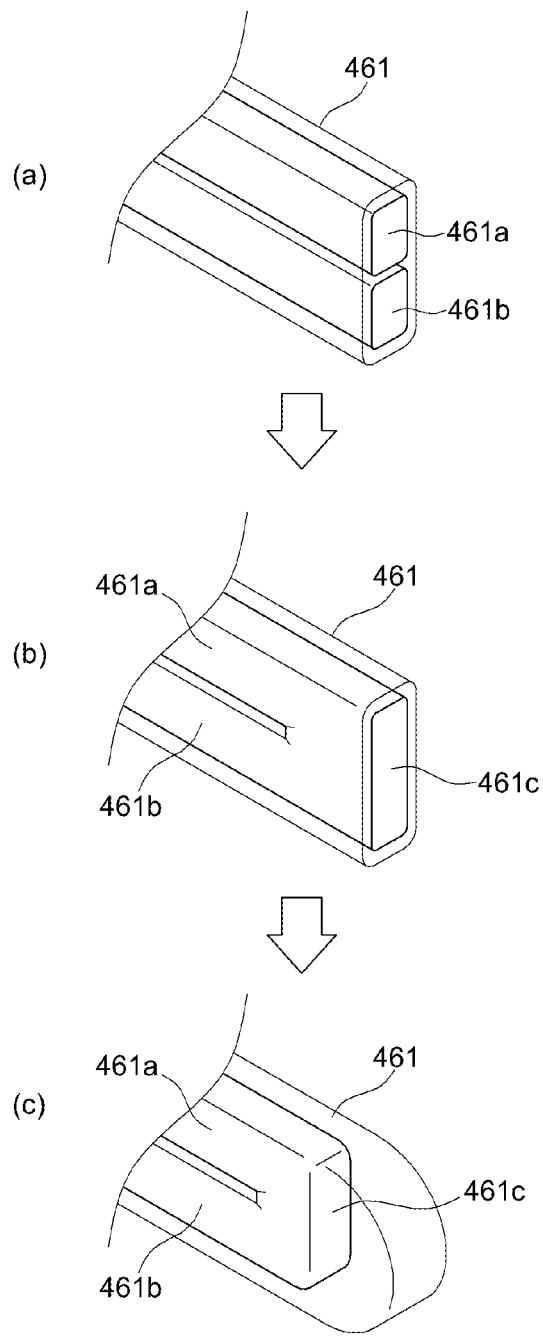

With reference to FIG. 9b, (a) illustrates an end of the tube 461 described in FIG. 9a. As illustrated in (b), a wall in the tube 461 disposed between the first tube 461a and the second tube 461b is partially removed, such that the first filling cavity and the second filling cavity are connected. As illustrated in (c), a first end of the tube 461 is subjected to heat and sealed, such that the connecting unit 461c including the third filling cavity can be formed. Of course, glass frit, which is formed of the same material as the tube 461, may be used to seal the first end of the tube 461.

Figure 9C:
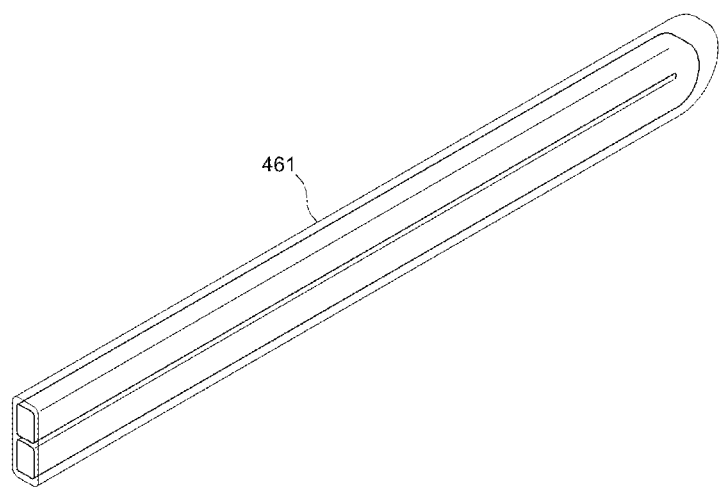

As illustrated in FIG. 9c, the tube 461 may include an inner cavity having a U-shaped cross-section.

Figure 9D:
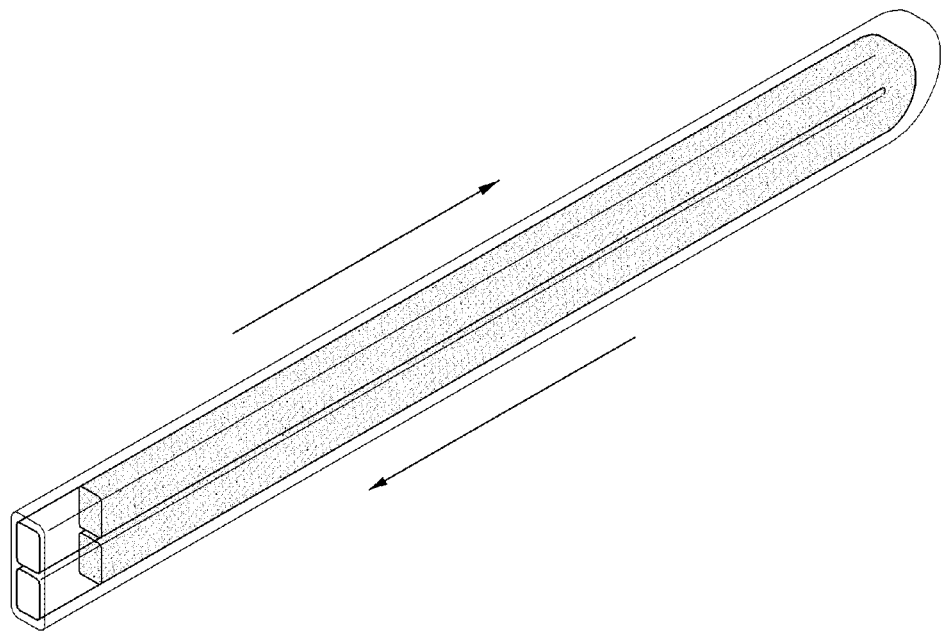

With reference to FIG. 9d, a phosphor 462 is injected into the tube 461 in a direction of an arrow. The phosphor 462 is injected into the first tube 461a, and subsequently the second tube 461b is filled with the injected phosphor 462. In other words, the phosphor 462 is injected into the first filling cavity of the first tube 461a, and the phosphor 462 is injected into the second filling cavity of the second tube 461b through the third filling cavity of the connecting unit 461c.

Figure 9E:
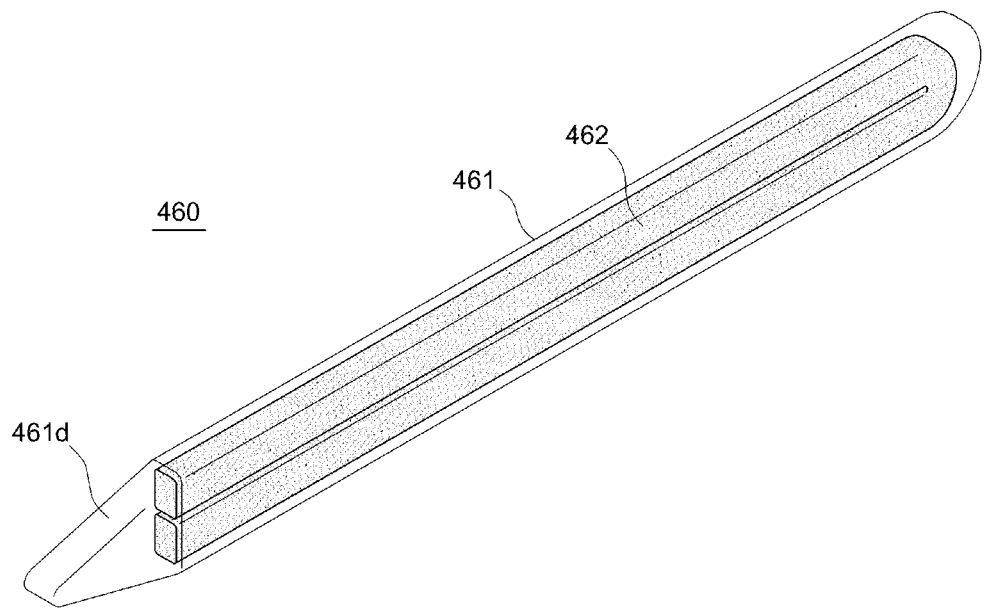

With reference to FIG. 9e, a second end of the tube 461 is sealed with the sealing member 461d, such that the quantum dot filled tube 461 is formed. A thermoplastic frit, which is formed of the same material as the tube 461, can be connected to the second end of the tube 461.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A quantum dot filled tube comprising:
   a tube having a cavity therein; and
   a phosphor disposed inside the tube,
   wherein the tube comprises:
   a first tube including a first filling cavity therein;
   a second tube including a second filling cavity therein, wherein the second tube is disposed inside the first tube and an external surface of the second tube is connected to an inner surface of the first tube; and
   a connecting unit including a third filling cavity configured to connect the first filling cavity and the second filling cavity.

2. The quantum dot filled tube of claim 1, wherein the first tube is disposed parallel to the second tube.

3. The quantum dot filled tube of claim 2, wherein the connecting unit is bent at a first end of the first tube and extended to a first end of the second tube.

4. The quantum dot filled tube of claim 3 further comprising a sealing member for sealing a second end of the first tube and a second end of the second tube.

5. The quantum dot filled tube of claim 1, wherein the connecting unit has a U-shaped cross-section.

6. The quantum dot filled tube of claim 1, wherein the first filling cavity is spaced apart from the second filling cavity by a distance in a range of about 0.1 mm to about 1 mm.

7. The quantum dot filled tube of claim 1, wherein the first tube and the second tube have a diameter in a range of about 0.5 mm to about 2.5 mm.

8. The quantum dot filled tube of claim 1, wherein the first to third filling cavities have a diameter in a range of about 0.4 mm to about 2.3 mm.

9. The quantum dot filled tube of claim 1, wherein the phosphor includes quantum dot particles.

10. The quantum dot filled tube of claim 9, wherein the quantum dot particles have a diameter in a range of about 2 nm to about 10 nm.

11. A display device comprising:
    a light source configured to emit light;
    a light guide plate configured to have the light be incident on one surface and be emitted from an other surface of the light guide plate; and
    at least one quantum dot filled tube disposed between the light source and the light guide plate, wherein the quantum dot filled tube comprises:
a tube having a cavity therein; and
a phosphor disposed inside the tube,
wherein the tube comprises:
   a first tube including a first filling cavity therein;
   a second tube including a second filling cavity therein; and
   a connecting unit including a third filling cavity configured to connect the first filling cavity and the second filling cavity.

12. The display device of claim 11, wherein the first tube is disposed parallel to the second tube.

13. The display device of claim 12, wherein the connecting unit is bent at a first end of the first tube and extended to a first end of the second tube.

14. The display device of claim 13 further comprising a sealing member for sealing a second end of the first tube and a second end of the second tube.

15. The display device of claim 11, wherein the connecting unit has a U-shaped cross-section.

16. The display device of claim 11, wherein the first tube is spaced apart from the second tube by a distance in a range of about 0.1 mm to about 1 mm.

17. The display device of claim 11, wherein the second tube is disposed inside the first tube.

18. The display device of claim 17, wherein an external surface of the second tube is connected to an inner surface of the first tube.

* * * * *